July 27, 1943.  R. HASTINGS, JR  2,325,396
TRUCK HAVING BOOSTER MECHANISM
Filed Dec. 26, 1941  3 Sheets-Sheet 1
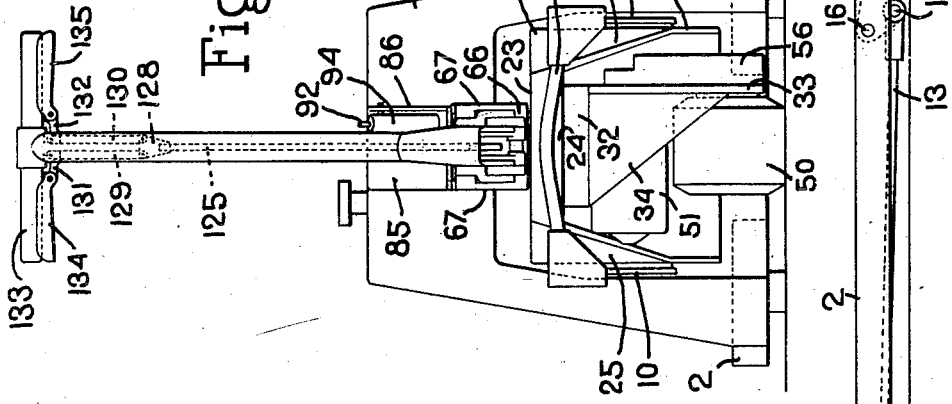
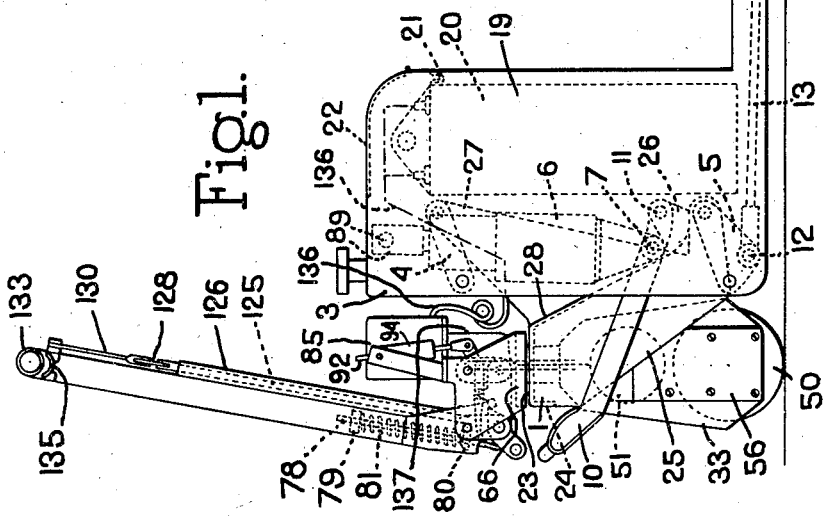
Inventor.
Russell Hastings Jr.
by Heard, Smith & Tennant
Attys.

July 27, 1943.  R. HASTINGS, JR  2,325,396
TRUCK HAVING BOOSTER MECHANISM
Filed Dec. 26, 1941   3 Sheets-Sheet 2

Inventor.
Russell Hastings Jr.
by Heard Smith & Tennant.
Attys.

Inventor.
Russell Hastings Jr.
by Heard Smith & Tennant.
Attys.

Patented July 27, 1943

2,325,396

UNITED STATES PATENT OFFICE 2,325,396

TRUCK HAVING BOOSTER MECHANISM

Russell Hastings, Jr., Wellesley, Mass., assignor to Lewis-Shepard Company, Watertown, Mass., a corporation of Massachusetts Application December 26, 1941, Serial No. 424,445

17 Claims. (Cl. 180—13)

This invention relates to improvements in trucks preferably, but not necessarily, of the type having load supporting means adapted to be introduced beneath a skid supporting the articles to be transported, and thereupon raised to lift the skid and load from the floor and to transport them to a desired destination.

The object of the invention broadly is to provide a truck having a wheel supported frame provided with steering mechanism rotatable about a vertical axis with a controller mounted on the steering mechanism to move to and from a normal neutral position in the direction of travel of the steering wheel and having a motor operable to drive the truck, with means operable by the movement of the controller from said neutral position in the desired direction of travel of the steering wheel to cause the motor to drive the truck in the direction guided by the steering wheel.

More specifically the invention is designed to be applied to trucks having a steering mechanism rotatable about a vertical axis and provided with a steering tongue mounted to swing vertically by which the truck may be pushed and pulled, with a booster motor of any suitable character for driving the truck, in which a controller for the motor, mounted on the steering mechanism to move to and from a normal neutral position in the direction of travel of the steering wheel, is moved from neutral position by the pulling or pushing force applied to the tongue to cause the motor to drive the truck in the direction of the applied force.

A further object of the invention is to provide a hand truck construction having a booster motor which is automatically controlled by the usual pulling or pushing motions applied by the operator to a steering handle or tongue thereby enabling an operator to use the truck in the accustomed manner.

Another object of the invention is to provide the truck with braking mechanism normally acting to oppose or arrest movement of the truck with means operable by the steering handle or tongue to move the controlling mechanism from neutral position to release the braking mechanism.

A further object of the invention is to provide means easily accessible to the operator preferably including a member carried by the tongue for releasing the braking mechanism when the controller is in neutral position irrespective of the angular position of the tongue about a vertical or horizontal axis.

A further object of the invention is to provide a construction which will insure safety to the operator by a "dead man" principle of control operable by only a small movement of the steering handle or tongue thereby insuring a prompt response to any careless relaxation of the operator.

Another object of the invention is to provide further safety to the operator by means for controlling the brake operable when the tongue is in the down position, and the operator consequently at a distance from the truck, which will prevent the truck from coasting against the operator.

Another object of the invention is to provide a construction in which the truck may be operated forwardly or rearwardly with the steering handle or tongue in either upright or down position.

Another object of the invention is to provide a construction in which the brake may be partially and gradually applied with the steering handle or tongue in normal steering and pulling or pushing position.

Another object of the invention is to provide a spring balance for the steering handle or tongue so mounted as to have no tendency to modify the action of the mechanism for restoring the controller to neutral position.

Another object of the invention is to provide novel means for driving the steering wheel comprising an electric motor preferably mounted in proximity to the steering wheel thereby producing a compact construction and avoiding the necessity of belt or chain power transmitting mechanism and the necessary adjustments therefor or the necessity of a differential or universal joints.

A further object of the invention is to provide a construction which will enable easy substitution of gear ratios between the motor and the steering wheel.

Another object of the invention is to provide an arrangement of the motor driving transmission and steering wheel which will permit easy accessibility to the driving wheel for changing tires (preferably by substitution of another steering wheel) and to the motor for changing brushes.

In the operation of hand trucks which are pushed and pulled by force applied to the tongue considerably greater power is required to move the truck from a position of rest than is required to move the truck after once it is started. Also greater power must be applied to the truck upon pushing or pulling the same up an incline than is required to move the truck along a substantially level floor or ground. In many instances in turning into or from a narrow aisle the tongue is required to be raised or so positioned that it is difficult to apply manually sufficient force to the tongue to move the truck and the present invention has for its object means operable by a relatively light force applied to the tongue in the proper direction to cause actuation of the motor to start and drive the truck or to supplement the manual force applied to the tongue.

Another important object of the invention is to provide a motor driven steering wheel unit which can be readily embodied in different types of hand trucks thereby minimizing the cost of manufacture thereof and also which may be embodied in auto type trucks having two spaced steering wheels with single controlling mechanism for both.

These and other objects and features of the invention will more fully appear from the following description and the accompanying drawings and will be particularly pointed out in the claims.

While the present invention may be applied to various types of trucks, particularly hand trucks which are operable by a tongue mounted to swing vertically, the invention is illustrated herein as applied to a pallet truck of the type disclosed in my prior Patent No. 2,234,925, granted March 11, 1941, for Elevating trucks for pallets and the the like, and in which the load supporting means is raised by hydraulically operable mechanism of the type disclosed in Patent No. 2,161,660, granted June 6, 1939, to Messrs. Shepard and Warshaw for "Elevating truck having pedal operated fluid actuated lifting mechanism."

A preferred embodiment of the invention is illustrated in the accompanying drawing, in which, Fig. 1 is a side elevation of a pallet truck embodying the invention showing the load supporting means in lowered position, the hydraulic lifting mechanism being graphically indicated by dotted lines;

Fig. 2 is a front elevation of the truck;

Figure 6:
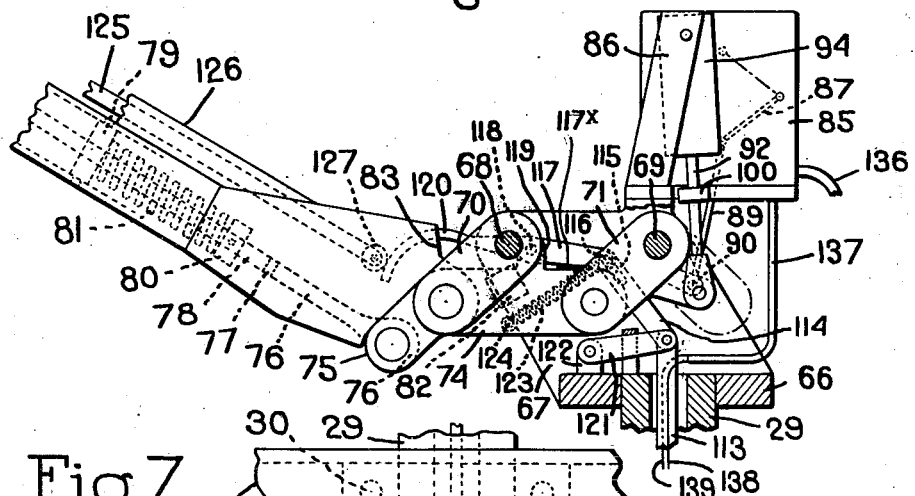
Figure 7:
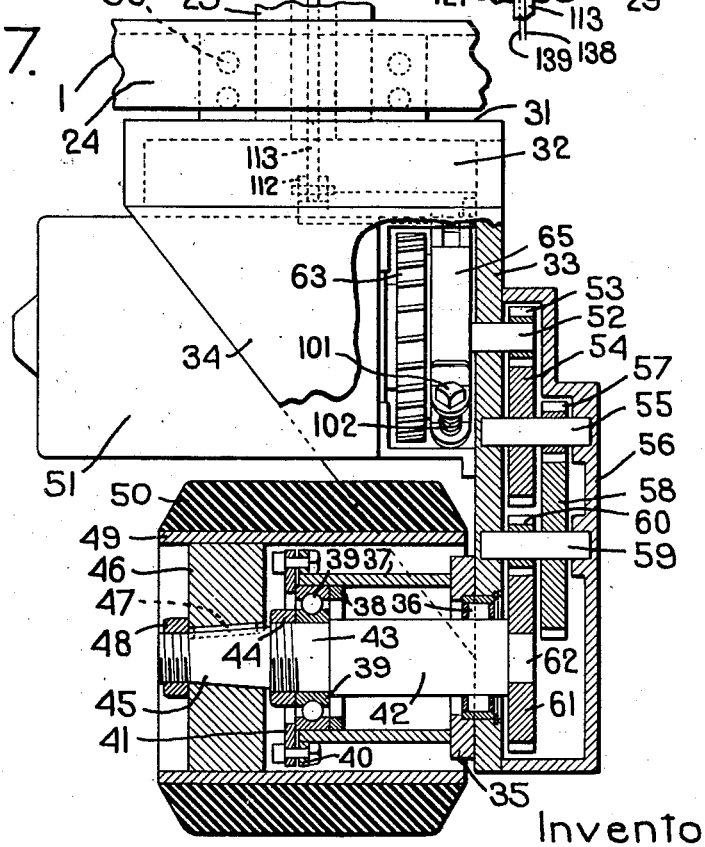

Fig. 6 is a detail side elevation showing the tongue and controller pulled forwardly and illustrating graphically a switch in the circuit of an electric motor positioned to drive the truck forwardly and the position of the mechanism for releasing the brake; and, Fig. 7 is a detail view, partly in front elevation and partly in vertical section, illustrating the mounting of the motor and steering wheel and the train of gears for driving the steering wheel from the motor.

The invention is illustrated herein as applied to a truck having a preferably fabricated main frame which may be integral but which as illustrated herein comprises a front head section 1 in which the steering mechanism is mounted and a rear load supporting section 2 having a front standard 3 connected to the head section by upper and lower pairs of substantially parallel links 4 and 5. Hydraulic lifting mechanism 6 is pivotally supported at its lower end upon a transverse shaft 7 mounted on the head section of the frame with the ram 8 of the hydraulic lifting mechanism pivotally connected to a transverse shaft 9 which is suitably mounted in the upper end of the standard. The hydraulic lifting mechanism is actuated to raise the front end of the truck by a pedal lever 10 which is pivotally mounted upon a transverse shaft 11 which is mounted on the head section of the frame and is connected by suitable mechanism for actuating the hydraulic ram as fully disclosed in my prior Patent No. 2,234,925.

The lower pair of links 5 are of generally triangular form and are connected by a shaft 12 and rods 13, which extend longitudinally of the load supporting section of the frame and connect the respective links to shafts 14 which are mounted in the lower portion of essentially triangular levers 15, the front ends of which are mounted upon transverse shafts 16 in the frame with floor-engaging wheels 17 mounted upon shafts 18 at the rear ends of the levers 15. When, therefore, the front end of the load supporting section of the main frame is raised by actuation of the hydraulic lifting mechanism the triangular links 5 will be swung upwardly thereby drawing the rods forwardly and rocking the levers 15 about their fulcrum shafts 16, thus drawing the wheels 17 forwardly and lifting the rear end of the load supporting means.

The present construction differs from that disclosed in my prior Patent No. 2,234,925, in that the upper links 4 and lower links 5 are so constructed and positioned that the front end of the frame will be raised vertically without substantial longitudinal movement relatively to the head section of the frame.

In the present construction, as illustrated in Fig. 1, the standard at the front end of the load supporting section is provided with a rearwardly extending casing 19 to receive a storage battery 20 which is supported by a suitable connection 21 to the head section 1 or to the standard, and the casing 19 desirably is provided with a hinged cover 22 adapted to be swung open to permit the removal and replacement of the storage battery 20.

The head section of the frame desirably is of fabricated sheet steel construction of the general shape illustrated in Fig. 2 of my prior patent, and comprises a top plate 23 provided with a downwardly extending front flange 24 which is welded to it, (see Fig. 3), and connected at its ends by welding to side plates 25 which diverge downwardly and outwardly and merge at their lower ends into vertical plates 26 having parallel rearward extensions in the lowermost of which the shaft 11 of the pedal mechanism and the rear pivotal shaft of the links 5 are mounted. The plates 26 are also provided with upward extensions 27 in which the pivotal shafts of the upper pair of links are mounted. The rear edges of the sides plates 25 are welded to a transverse plate 28. By reason of this welded construction the front section of the frame is a rigid integral unit.

The top plate 23 of the head section of the frame is provided with a suitable aperture through which the steering post 29 of the steering mechanism extends. The steering post 29 is journaled in suitable antifriction bearings 30 which are housed by the downwardly flanged portion 24 and side plates 25 of the head section of the frame. The upper end of the bearing 30 engages the under face of the plate 23 of the head section of the frame and the lower end thereof engages a shoulder 31 upon an integral downwardly extending flanged portion 32 which forms the head of the steering post. A heavy vertical side plate 33, which is welded to the head portion of the steering post, provides a support upon which the steering wheel of the truck, the motor and the train of gears for driving the steering wheel from the motor are mounted. Preferably front and rear triangular gusset plates 34, which are welded at their upper ends to the head 32 and to the plate 33, provide a rigid structure for the mountings of the steering wheel and the motor for driving the same.

As illustrated herein a reenforcing ring 35 is welded to the lower portion of the plate 33 and an antifriction, preferably roller, bearing 36 is mounted in an aperture extending through the plate 33 and reenforcing ring 35. A horizontal cylindrical sleeve 37 is welded to the ring 35 and has welded to it at a suitable distance from its end a ring 38 which forms an abutment for an antifriction, preferably ball, bearing 39. The sleeve 37 is provided at its end with a flange 40 to which is bolted a retaining ring 41 which abuts against the opposite face of the bearing 39. The steering wheel shaft 42 is rotatably mounted in the antifriction bearings 36 and 39 and is provided with a section 43 of reduced diameter upon which the inner race of the bearing 39 is mounted and the reduced section 43 is provided with a screw threaded portion upon which a clamping nut 44 is mounted to engage and clamp the inner race of the bearing 39 against the shoulder at the end of the reduced section. The shaft 42 has a tapered end portion 45 upon which the web 46 of the steering wheel is mounted and secured to the tapered end portion of the steering wheel shaft by a suitable key 47. A nut 48 upon the screw threaded end of the tapered extension 45 clamps the web of the wheel 46 firmly upon the tapered portion 45 of the steering wheel shaft. The cylindrical rim 49 of the steering wheel is welded to the web 46 and preferably extends nearly to the vertical side plate 33 and is provided with a preferably rubber tire 50, or rubber composition or other plastic material, which is moulded or otherwise fixedly secured to the rim 49.

By reason of this construction the steering wheel can be readily assembled upon the steering wheel shaft, removed therefrom and replaced when the tire becomes worn without dismantling any other portion of the mechanism.

A suitable electric motor is mounted upon the plate 33 and the steering wheel is driven from the motor shaft by a suitable reduction train of gearing. In the preferred construction illustrated the motor casing 51 is bolted or otherwise secured to the vertical plate 33 and the motor shaft 52 extends through the plate 33 and is provided with a pinion 53 which meshes with a gear 54 which is fixedly secured to a shaft 55 one end of which is journaled in the plate 33. The opposite end of the shaft 55 is journaled in a suitable socket in a gear case 56 which desirably is detachably secured to the plate 33. The shaft 55 is provided with a pinion 57 which in turn meshes with a gear 58 which is fixedly secured to a shaft 59 one end of which is journaled in the plate 33 and the other end of which is journaled in a suitable socket in the gear case 56. The shaft 59 is provided with a pinion 60 which meshes with a gear 61 which is fixedly secured to a reduced end portion 62 of the steering wheel shaft 42.

By reason of this construction gear trains having different ratios for driving the steering wheel from the motor may be employed by merely removing the gear case and substituting complementary gears and pinions having the desired ratio.

Desirably the steering wheel mounting is provided with oil seals (not shown) which will enable the sleeve 37 and the lower portion of the gear case to contain a sufficient lubricant to maintain proper lubrication for the steering wheel shaft and the gearing through which it is driven.

The motor shaft desirably has secured to it a cooling fan 63 and has also fixedly secured to it a brake drum 64 adapted to be engaged by suitable brake bands 65 adapted to be actuated by mechanism hereinafter described.

*The controller mechanism*

The steering post has fixedly secured to its upper end a bracket upon which is mounted a controller which is movable from a normal neutral position in the direction of travel of the steering wheel and which is operable preferably by the pushing or pulling movement of the tongue to control the operation of a motor for driving the truck and is also operable to control braking mechanism for opposing or permitting movement of the truck as will hereinafter be described, it being understood that the operation of the controller is adapted to control any type of motor or any type of braking mechanism to produce the functions hereinafter described.

Figure 3:
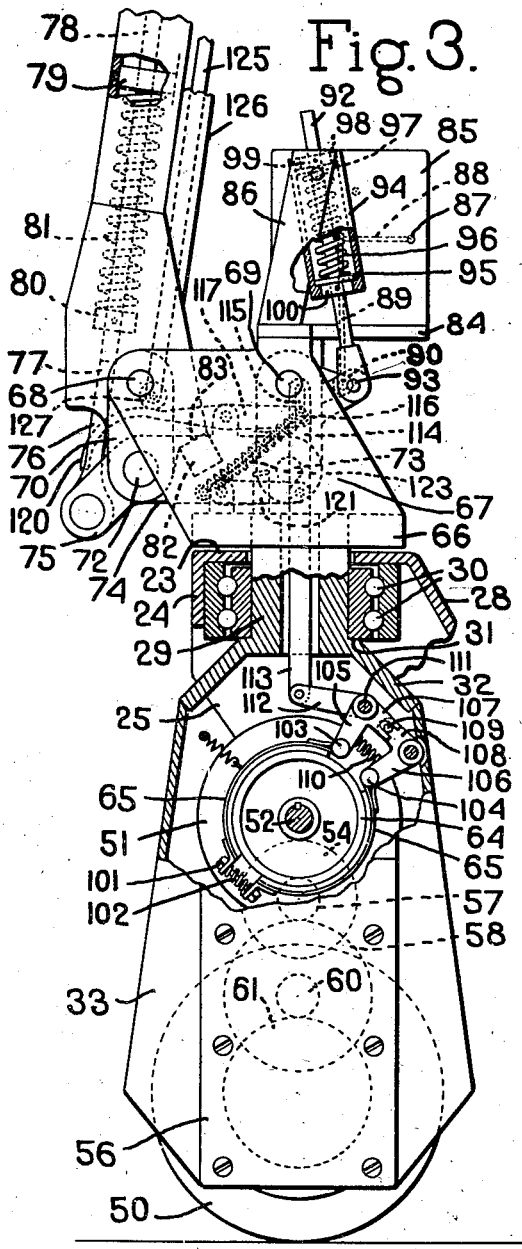
Fig. 3 is a detail view of the steering wheel unit and controller mainly shown in elevation and partly shown in section more clearly to illustrate the braking mechanism and the means for actuating the same from the controller, the controller being shown in neutral position.
Figure 4:
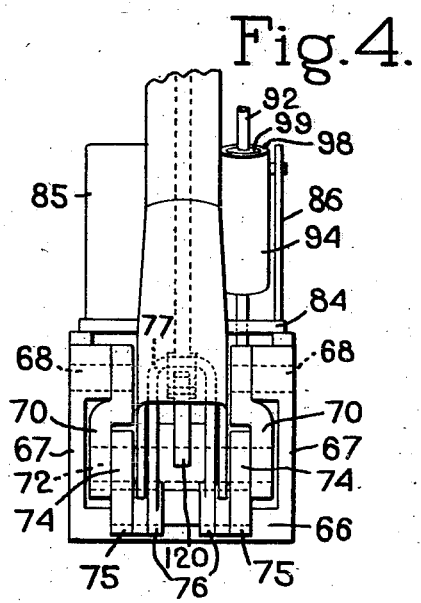
Fig. 4 is a detail front elevation of the portion of the tongue and the controller mechanism.

In the preferred construction disclosed herein the controller supporting bracket comprises a plate 66 which is preferably clamped to the upper end of the steering post and is provided with vertical side plates 67 which are welded to the plate 66. The plates 67 as illustrated are of general trapezoidal form and extend forwardly relatively to the axis of the steering post. Shafts 68 and 69, which are mounted upon inwardly extending bosses at the upper ends of the plates 67, form pivots for downwardly extending parallel links 70 and 71 which are offset outwardly and are respectively connected at their lower ends to shafts 72 and 73 upon which are mounted a controller comprising parallel plates 74 adapted to move longitudinally from a neutral position in which the links 70 and 71 are vertical, as illustrated in Fig. 3, longitudinally in the direction of travel of the steering wheel to a forward position, as illustrated in Fig. 6, upon application of a pulling force to the tongue, or to move rearwardly to the position illustrated in dot and dash lines in Fig. 6 when a pushing force is applied to the tongue.

Means desirably are provided for normally maintaining the tongue in upright position. In the present construction the controller plates are provided with forward and downward extensions 75 to which are pivoted arms 76 of a yoke 77 on the lower end of a rod 78 which extends longitudinally of and within the tongue and is mounted in a transverse plate 79 which is fixedly secured, preferably by welding, to the tongue. The rod 78 has mounted upon it a collar 80, and a coiled spring 81 interposed between the plate 79 and the collar 80 tends normally but yieldably to hold the tongue in upright position, as illustrated in Figs. 1 and 3. Rearward movement of the tongue beyond a substantially vertical position is prevented by blocks 82 which are fixedly secured to the controller plates 74 and are engaged by a suitable shoulder 83 upon the end portion of the tongue.

A plate 84, which is mounted upon the upper end of the side plates 67 of the bracket, has mounted upon it a switch box 85 and also has mounted upon it parallel upwardly and rearwardly extending standards 86. The switch box contains a suitable switch which is graphically illustrated as having a pivotally mounted arm 87 adapted to be swung upwardly and downwardly from a neutral position 88 (Fig. 3) so that the movement of the switch from neutral position in opposite directions will reverse the current supplied to the motor but while in neutral position will break the circuit to the motor.

The switch arm 87 is connected by a link 89 to a shaft 90 which is mounted in extensions 91 projecting rearwardly from one of the links 71.

Yieldable means are provided for maintaining the controller normally in neutral position. This is accomplished as illustrated herein by a rod 92 which is pivotally mounted on a shaft 93 on an extension of the other link 71 and extends upwardly through a suitable recess in the plate 84 axially through a cylinder 94 which is pivotally mounted at its upper end on trunnions on the upper ends of the standards 86.

The lower end of the cylinder 94 has an internal flange which supports a washer 95 through which the rod 92 extends. A spring 96, which is seated on the washer 95, engages at its upper end a washer 97 which bears against a plug 98 which preferably is screwed into the upper end of the cylinder and is provided with an axial bore which permits a collar 99 on the rod 92 to pass through it. A similar collar 100, which is secured to the rod 92, engages the under side of the washer 95 when the spring 96 holds the parts of the controller mechanism in neutral position, as shown in Fig. 3. When the controller is moved forwardly by a pulling force applied to the tongue, as illustrated in Fig. 6, the extension of one of the links 71 swings downwardly thereby causing the collar 99 to force the washer 97 downwardly thus compressing the spring 96. Upon release of the pulling force the expansion of the spring 96 will restore the controller to neutral position, illustrated in Figs. 1 and 3. Conversely when a pushing force is applied to the tongue the links 71 will be swung rearwardly and the extension of the link 71 will be swung upwardly thereby raising the collar 100 and the washer 95, thereby compressing the spring 96. Upon release of the pushing force the spring will expand thereby forcing the washer 95 downwardly against the internal flange of the cylinder 94 and act to restore the controller to neutral position.

*The braking mechanism*

The braking mechanism comprises broadly suitable means of any character acting normally to oppose movement of the truck with means connecting the same to the controller and operable by the movement of the controller from neutral position to release the brake. Manually operable means, preferably mounted upon the tongue and easily accessible to the operator, are also provided for releasing the brake when the controller is in neutral position, thereby permitting the truck to coast when the operator so desires.

In the preferred embodiment of the invention illustrated herein the brake comprises brake bands adapted to embrace and frictionally to engage a drum which is fixedly secured to the motor shaft, with means normally acting to apply the brake and means operable by the controller when moved from neutral position to release the brake bands from engagement with the brake drum, and also comprises lever mechanism mounted upon the usual cross bar at the end of the tongue which may be grasped by the operator and so connected to the braking mechanism as to actuate the brake releasing mechanism when the controller is in neutral position and not to affect the brake when the controller is in forward or rearward position.

As heretofore described the brake comprises a pair of brake bands or shoes 65 positioned to embrace diametrically opposite sides of the brake drum 64.

The brake bands or shoes 65 are provided at their lower ends with outwardly extending brackets which are connected by an adjustable bolt 101 and a spiral spring 102 surrounding the bolt and interposed between the brackets serves normally to position the brake bands properly with respect to the drum. The upper ends of the brake bands have looped portions which engage shafts 103 and 104 on the downwardly extending arms 105 and 106 of complementary bell crank levers which have overlapping arms 107 and 108, the arm 107 of one of the bell crank levers having a slotted end adapted to be engaged by a pin 109 upon the arm 108. A compression spring 110 normally tends to separate the arms 105 and 106 thereby to release the brake.

Figure 5:
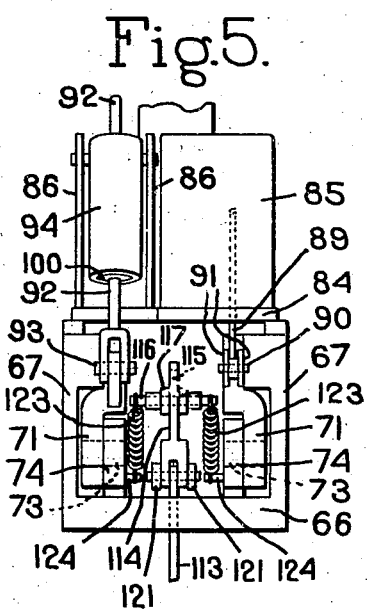
Fig. 5 is a detail rear view of the same.

The bell crank lever having the arms 105 and 107 is fixedly secured to a shaft 111 to which is fixedly secured an arm 112 which is pivotally connected to a link 113 which extends upwardly through a central vertical aperture in the steering post 29 and is pivotally connected at its upper end to a link 114 which is provided near its upper end with a longitudinal slot 115 which slidably engages a shaft 116 which is mounted in the bifurcated end of a lever 117 (see Figs. 3, 5, and 6). The lever 117 is fulcrumed upon a shaft 118 mounted in bosses 119 extending upwardly from the controller plates 74. The opposite end portion of the lever 117 is provided with an arcuate section 120 adapted to be engaged by manually operable mechanism for releasing the brake hereinafter described.

A guiding link 121, which is pivotally mounted in suitable bosses 122 on the steering head plates 66, is pivotally connected at its rear end to the pivotal rod which connects the vertical link 113 to the link 114 and acts to maintain the link 113 in substantially vertical position irrespective of the position of the controller.

The means for normally applying the brake comprises the spring 96 which tends to restore the controller 74 to neutral position and means operable thereby to clamp the brake bands upon the brake drum. The controller has not only a forward and backward movement in response to a pulling or pushing force, but also moves in an arc, produced by the parallel links 70 and 71, having its lowest point in the neutral position. All shafts and other parts mounted in said controller therefore must move through identical arcs. The shaft 116 is located with respect to the controller 74 by means of the lever 117 which is held against the stop 117x by the force of the tension springs 123 which are connected at their upper ends to the shaft 116 and at their lower ends to pins 124 mounted in and extending inwardly from the controller plates 74. The shaft 116 must therefore move through the same arc. Considering the motion from an extreme forward position, illustrated in Fig. 6, the first portion of the movement through this arcuate path moves the switch arm 87 to a position in which it will interrupt the electric circuit, while the shaft 116 merely slides freely toward the bottom end of the slot 115.

After the shaft 116 engages the bottom of the slot further movement of the shaft 116 through said arc causes the link 114 to push the link 113 downwardly thereby applying the brake. The mechanism is so adjusted that the brake will be fully applied before the shaft 116 has reached the lowest portion of the arc. The final portion of the arcuate movement to neutral position therefore cannot produce any further downward motion of the links 114 and 113 but instead merely reacts against the tension of the springs 123 causing the lever 117 to rotate upwardly a small amount so that the tension of the spring 123 continues to maintain the brake in fully applied position. The springs 123 therefore serve to take up any wear on the brake band shoes or other parts of the brake mechanism. When the tongue is subjected either to a sufficient pulling or pushing force to compress the spring 96 and thereby move the controller from neutral position, the reverse action will take place and the brake will be released.

By reason of the construction thus described the operator may grasp the tongue and exert only sufficient force to move the controller from neutral position thereupon releasing the brake so that the truck can be moved. At the same time the movement of the controller from neutral position will cause the switch actuating link 89 to move the switch arm 87 from neutral position to a proper position to complete the electric circuit to the motor and cause the current to flow in a proper direction to cause such actuation of the motor as will drive the steering wheel in the direction of movement of the pulling or pushing force which is applied to the tongue.

The manually operable mechanism for releasing the brake when the controller is in neutral position comprises a rod 125 which is mounted in a suitable guide 126 on the tongue and is provided at its lower end with a roller 127 which engages the arcuate end portion 120 of the lever 117 (Figs. 3 and 6). The upper end of the rod 125 (Fig. 1) is centrally connected to the apex portion of a triangular plate 128 the base portion of which is connected to parallel links 129 and 130 the upper ends of which are connected respectively to adjacent ends of levers 131 and 132 which are fulcrumed upon the cross bar or handle 133 and are provided with hand grips 134 and 135 respectively.

By reason of this construction the operator in grasping the cross bar of the tongue can also grasp either of the hand grips 134 and 135 and by pinching the same toward cross bar 133 force the rod 125 downwardly so that the roller 127 at the lower end of the rod 125 will depress the arcuate end 120 of the lever 117 and when the controller is in neutral position will raise the shaft 116 in the slot 115, thus relieving the downward pressure of the springs 123 and thereby enabling the spring 110 to separate the arms 105 and 106 of the bell crank braking levers and releasing the brake bands 65 from engagement with the drum 64.

Such manual release of the brake can be accomplished when the tongue is in vertical position, as illustrated in Figs. 1 and 2, or when the tongue is swung forwardly or rearwardly or in any steering position without moving the controller from neutral position.

The construction above described therefore provides for the manual release of the brake whenever the controller is in neutral position and not only enables the operator to release the brake when the truck is stationary but also enables the operator when a pulling or pushing force has been applied to the tongue and sufficiently relieved to permit the controller to be moved to neutral position to release the grip upon the levers 134 or 135 and thereby restore the brake to operative braking position. Thus the operator is enabled to apply the brake during the coasting of the truck down an incline or at any other time when the controller is in neutral position.

Any suitable means may be provided for conducting an electric current from the storage battery 20 to the controlling switch. As conventionally illustrated herein a flexible cable 136, which is connected to the terminals of the storage battery 20, leads to the proper terminals of the switch within the switch box 85. A suitable cable 137 having conductors suitably connected to the switch leads downwardly from the switch box 85 and is provided with branches 138 and 139 for the respective conductors which extend downwardly through the vertical passage in the steering post to the terminals of the motor as will be readily understood by those skilled in the art.

In the operation of the truck, assuming that the controller is in neutral position, as illustrated in Figs. 1 and 3, the operator may grasp the cross bar 133 of the tongue and also may grip one or both of the hand levers 134 or 135 to release the brake, thereby enabling the truck to be pushed forwardly or backwardly by force applied to it otherwise than through the tongue. Alternatively, the operator may grasp the cross bar of the tongue along with or without gripping the levers 134 and 135 and apply a pushing or pulling force to the tongue sufficiently to move the controller in the desired direction of travel of the steering wheel. Such movement of the controller will automatically release the brake mechanism and simultaneously actuate the switch in the motor circuit to cause actuation of the motor in the proper direction to drive the steering wheel in the desired direction of travel, thereby supplementing the power applied manually to the tongue which in many instances may only be sufficient to maintain the controller out of neutral position in the desired direction of travel of the steering wheel.

If the truck is coasting along an incline, or otherwise has acquired a momentum which causes it to move more rapidly than desired, the operator may relieve the pulling or pushing force applied to the tongue sufficient to enable the controller to be restored automatically by the spring 96 to neutral position, whereupon the current to the motor will be broken and the brake automatically applied in the manner heretofore described.

By reason of the present invention therefore the truck can be moved with a minimum exertion by the operator and will be always under his control by manipulation of the tongue irrespective of the steering position of the tongue or the upward or downward position thereof. If the tongue is released by the operator at any time the controller will automatically return to neutral position, the motor circuit will be broken, and the brake applied thereby opposing or arresting movement of the truck.

It will be understood that the embodiment of the invention specifically described herein is of an illustrative character, that the invention may be applied to any type of truck for which it may be adapted including trucks having two cooperating steering heads having driving or braking mechanisms operated from a similar controller, and that various modifications in form, construction and arrangement of parts may be made within the spirit and scope of the following claims.

Having thus described the invention, what is claimed as new and desired to be secured by Letters Patent is:

1. A hand truck having a wheel-supported frame provided with steering head rotatable about a vertical axis, a controller mounted on said steering head to move horizontally relatively to the vertical axis of the steering head to and from a normal neutral position in the direction of travel of the steering wheel, a steering tongue mounted on said controller to swing vertically, a motor, and means operable by said controller when moved forwardly from said neutral position by pulling the tongue bodily forwardly relatively to the vertical axis of the steering head to cause the motor to drive the truck forwardly.

2. A hand truck having a wheel-supported frame provided with steering head rotatable about a vertical axis, a controller mounted on said steering head to move horizontally relatively to the vertical axis of the steering head to and from a normal neutral position in the direction of travel of the steering wheel, a steering tongue mounted on said controller to swing vertically, a motor, and means operable by said controller when moved horizontally rearwardly from said neutral position by pushing the tongue bodily rearwardly relatively to the vertical axis of the steering head to cause the motor to drive the truck rearwardly.

3. A hand truck having a wheel-supported frame provided with a steering head rotatable about a vertical axis, a controller mounted on said steering head to move horizontally relatively to the vertical axis of the steering head to and from a neutral position in the direction of travel of the steering wheel, yieldable means normally acting to retain the controller in neutral position, a steering tongue mounted on said controller to swing vertically, a motor, means operable thereby to drive the truck, and means operable by the movement of the controller from neutral position by pushing or pulling the tongue bodily forwardly or rearwardly relatively to the vertical axis of the steering head to cause the motor to drive the truck in the direction of the applied force.

4. A hand truck having a wheel-supported frame provided with a steering head rotatable about a vertical axis, a controller mounted on said steering head to move horizontally relatively to the vertical axis of the steering head to and from a neutral position in the direction of travel of the steering wheel, yieldable means normally acting to retain the controller in neutral position, a steering tongue mounted on said controller to swing vertically, a motor, means operable thereby to drive the truck, means operable by the movement of the controller from neutral position by pushing or pulling the tongue bodily forwardly or rearwardly relatively to the vertical axis of the steering head to cause the motor to drive the truck in the direction of the translation movement of the tongue, braking means normally acting to prevent movement of the truck, and means connecting the braking means to said controller operable by the movement of the controller from neutral position to release the braking means.

5. A hand truck having a wheel-supported frame provided with a steering head rotatable about a vertical axis, a controller mounted on said steering head to move horizontally relatively to the vertical axis of the steering head to and from a neutral position in the direction of travel of the steering wheel, yieldable means normally acting to retain the controller in neutral position, a steering tongue mounted on said controller to swing vertically, a motor, means operable thereby to drive the truck, means operable by the movement of the controller from neutral position by pulling or pushing the tongue bodily forwardly or rearwardly relatively to the vertical axis of the steering head to cause the motor to drive the truck in the direction of the translation movement of the tongue, braking means normally acting to prevent movement of the truck, means connecting the braking means to said controller operable by the movement of the controller from neutral position to release the braking means, and means on said tongue easily accessible to the operator for releasing the braking means when the controller is in neutral position.

6. A hand truck having a main frame provided with rear supporting wheels and having at its front end a wheeled steering head rotatable about a vertical axis, a controller mounted on said steering head to move horizontally relatively to the vertical axis of the steering head to and from a neutral position in the direction of travel of the steering wheel, yieldable means normally maintaining the controller in neutral position, a steering tongue mounted on said controller to swing vertically, an electric motor mounted on said steering head, means including a switch for supplying a current to said motor, means for driving the steering wheel from said motor, and means operable by said controller when moved from neutral position by pulling or pushing the tongue bodily forwardly or rearwardly relatively to the vertical axis of the steering head so to position the switch as to cause the motor to drive the steering wheel in the direction of said pulling or pushing force.

7. A hand truck having a main frame provided with rear supporting wheels and having at its front end a wheeled steering head rotatable about a vertical axis, a controller mounted on said steering head to move horizontally relatively to the vertical axis of the steering head to and from a neutral position in the direction of travel of the steering wheel, yieldable means normally maintaining the controller in neutral position, a steering tongue mounted on said controller to swing vertically, an electric motor mounted on said steering head, means including a switch for supplying a current to said motor, means for driving the steering wheel from said motor, means operable by said controller when moved from neutral position by pulling or pushing the tongue bodily so to position the switch as to cause the motor to drive the steering wheel in the direction of the pulling or pushing force, a brake on the motor shaft, means normally acting to apply the brake, and means connecting the brake to said controller operable by the movement of the controller from neutral position to release the brake.

8. A hand truck having a main frame provided with rear supporting wheels and having at its front end a wheeled steering head rotatable about a vertical axis, a controller mounted on said steering head to move horizontally relatively to the vertical axis of the steering head to and from a neutral position in the direction of travel of the steering wheel, yieldable means normally maintaining the controller in neutral position, a steering tongue mounted on said controller to swing vertically, an electric motor mounted on said steering head, means including a switch for supplying a current to said motor, means for driving the steering wheel from said motor, means operable by said controller when moved from neutral position by pulling or pushing the tongue bodily so to position the switch as to cause the motor to drive the steering wheel in the direction of the pulling or pushing force, a brake on the motor shaft, means normally acting to apply the brake, means connecting the brake to said controller operable by the movement of the controller from neutral position to release the brake, and means on said tongue easily accessible to the hand of the operator for releasing said brake when the controller is in neutral position.

9. A hand truck having a main frame provided with rear supporting wheels and having at its front end a steering head rotatable about a vertical axis, and having a downwardly extending bracket, a steering wheel and an electric motor mounted on said bracket, means operable by said motor for driving the steering wheel, a controller mounted on said steering head to move horizontally relatively to the vertical axis of the steering head to and from neutral position in the direction of travel of the steering wheel, yieldable means normally maintaining the controller in neutral position, a tongue pivotally mounted upon said controller, means for supplying an electric current to said motor including a switch, and means connecting said controller to said switch operable by said controller when moved from neutral position by pushing or pulling the tongue bodily to cause said motor to drive the steering wheel in the direction of the pushing or pulling movement of the tongue.

10. A hand truck having a wheel supported frame provided with steering wheel head rotatable about a vertical axis, a controller mounted on said steering head mechanism to move horizontally relatively to the vertical axis of the steering head to and from a neutral position in the direction of travel of the steering wheel, a tongue pivotally mounted on said controller to swing vertically, spring actuated braking mechanism having resilient means acting normally to apply a brake and oppose movement of the truck, and means connecting said controller to said braking mechanism operable by pulling or pushing the tongue bodily lengthwise sufficiently to move the controller from neutral position as to cause said controller to release the brake.

11. A hand truck having a wheel supported frame provided with steering wheel head rotatable about a vertical axis, a controller mounted on said steering head mechanism to move horizontally relatively to the vertical axis of the steering head to and from a neutral position in the direction of travel of the steering wheel, a tongue pivotally mounted on said controller to swing vertically, spring actuated braking mechanism having resilient means acting normally to apply a brake and oppose movement of the truck, means connecting said controller to said braking mechanism operable by pulling or pushing the tongue bodily lengthwise sufficiently to move the controller from neutral position, to cause said controller to release the brake, and resilient means acting normally to maintain said controller in neutral position and operable upon sufficient relaxation of the force applied to the tongue to restore the controller to neutral position when the tongue is in pulling or pushing position and thereby permit application of the brake, whereby coasting of the truck may be governed by manipulation of the tongue.

12. A hand truck having a wheel supported frame provided with steering wheel mechanism rotatable about a vertical axis, a controller mounted on said steering head mechanism to move to and from a neutral position in the direction of travel of the steering wheel, a tongue pivotally mounted on said controller to swing vertically, spring actuated braking mechanism having resilient means acting normally to apply a brake and oppose movement of the truck, means connecting said controller to said braking mechanism operable, by a sufficient pulling or pushing force applied to the tongue to move the controller from neutral position, to cause said controller to release the brake, resilient means acting normally to maintain said controller in neutral position and operable upon sufficient relaxation of the force applied to the tongue to restore the controller to neutral position and thereby permit application of the brake, hand grip levers on said tongue easily accessible to the operator, and means operable thereby when gripped by the operator to release the brake when the tongue is in any position and the controller in neutral position, whereby coasting of the truck may be readily governed.

13. A truck having a wheel supported frame provided with a steering mechanism including a steering post mounted in said frame to rotate about a vertical axis, means for rotating the steering post to steer the truck, a steering wheel bracket rigid with said steering post having a downwardly extending rigid vertical plate, a horizontal wheel shaft rotatably journaled in and extending through the lower end portion of said vertical plate, a steering wheel fixedly mounted on said shaft, an electric motor mounted on said vertical plate above and in proximity to said steering wheel having its shaft journaled in and extending through said vertical plate, a gear casing detachably connected to said vertical plate, a train of gears for driving said steering wheel from said motor shaft, and complementary journals for the respective gear shafts in said vertical plate and gear case respectively so positioned as to permit installation of a train of gears having any desired gear ratio and to permit substitution therefor of a train of gears having a different gear ratio, means for supplying an electric current to said motor, and manually operable means for controlling said current.

14. A truck having a wheel supported frame provided with a steering mechanism including a steering post mounted in said frame to rotate about a vertical axis, means for rotating the steering post to steer the truck, a steering wheel bracket rigid with said steering post having a downwardly extending rigid vertical plate, an electric motor mounted on said vertical plate and having its rotor shaft extending therethrough, a horizontal wheel shaft rotatably journaled in and extending through the lower end portion of said vertical plate, and having at its opposite end an axle for the steering wheel, a train of gearing mounted on said plate for driving said steering wheel axle from said motor shaft, a sleeve concentric with said wheel shaft having a bearing spaced from said vertical plate, a cylindrical steering wheel having a rim concentric with said sleeve, and a web fixedly and detachably secured to said axle, whereby said steering wheel can be removed and replaced without dismantling or otherwise disturbing the actuating mechanism therefor.

15. A truck having a wheel supported frame provided with a steering mechanism including a steering post mounted in said frame to rotate about a vertical axis, means for rotating the steering post to steer the truck, a steering wheel bracket rigid with said steering post having a downwardly extending rigid vertical plate, an electric motor mounted on said vertical plate and having its rotor shaft extending therethrough, a horizontal wheel shaft rotatably journaled in and extending through the lower end portion of said vertical plate, and having at its opposite end an axle for the steering wheel, a train of gearing mounted on said plate for driving said steering wheel axle from said motor shaft, a sleeve concentric with said wheel shaft having a bearing spaced from said vertical plate and located in a vertical plane of the axis of the steering post, a cylindrical steering wheel having a wide rim with a tire of flexible material moulded upon and fixedly secured to it and having a web fixedly and detachably secured to said axle, whereby said steering wheel can be removed and replaced without dismantling or otherwise disturbing the actuating mechanism therefor.

16. A hand truck having a wheel supported frame provided with a steering mechanism rotatable about a vertical axis, a controller mounted on said steering mechanism to move horizontally relatively to said vertical axis to and from a normal neutral position in the direction of travel of the steering wheel, a steering tongue mounted on said controller to swing vertically to and from an upright position, a motor, and means operable by said controller when moved rearwardly from said neutral position by a pushing force applied to the tongue when in upright position to cause the motor to drive the truck rearwardly.

17. A hand truck having a wheel supported frame provided with steering mechanism rotatable about a vertical axis, a controller mounted on said steering mechanism to move to and from a normal neutral position in the direction of travel of the steering wheel, resilient means normally acting to maintain the controller in neutral position, a steering tongue mounted on said controller to swing vertically from and to an upright position, resilient means normally acting to maintain the tongue in upright position without tending to displace the controller from neutral position, a motor, and means operable by the controller when moved rearwardly from said neutral position by a pushing force applied to the tongue when in vertical or any angular position to cause the motor to drive the truck rearwardly.

RUSSELL HASTINGS, Jr.